Oct. 1, 1935.　　　　J. G. LINCOLN　　　　2,016,043
WELDING APPARATUS
Filed Jan. 27, 1931　　　5 Sheets-Sheet 1

INVENTOR
John G. Lincoln
BY
ATTORNEY

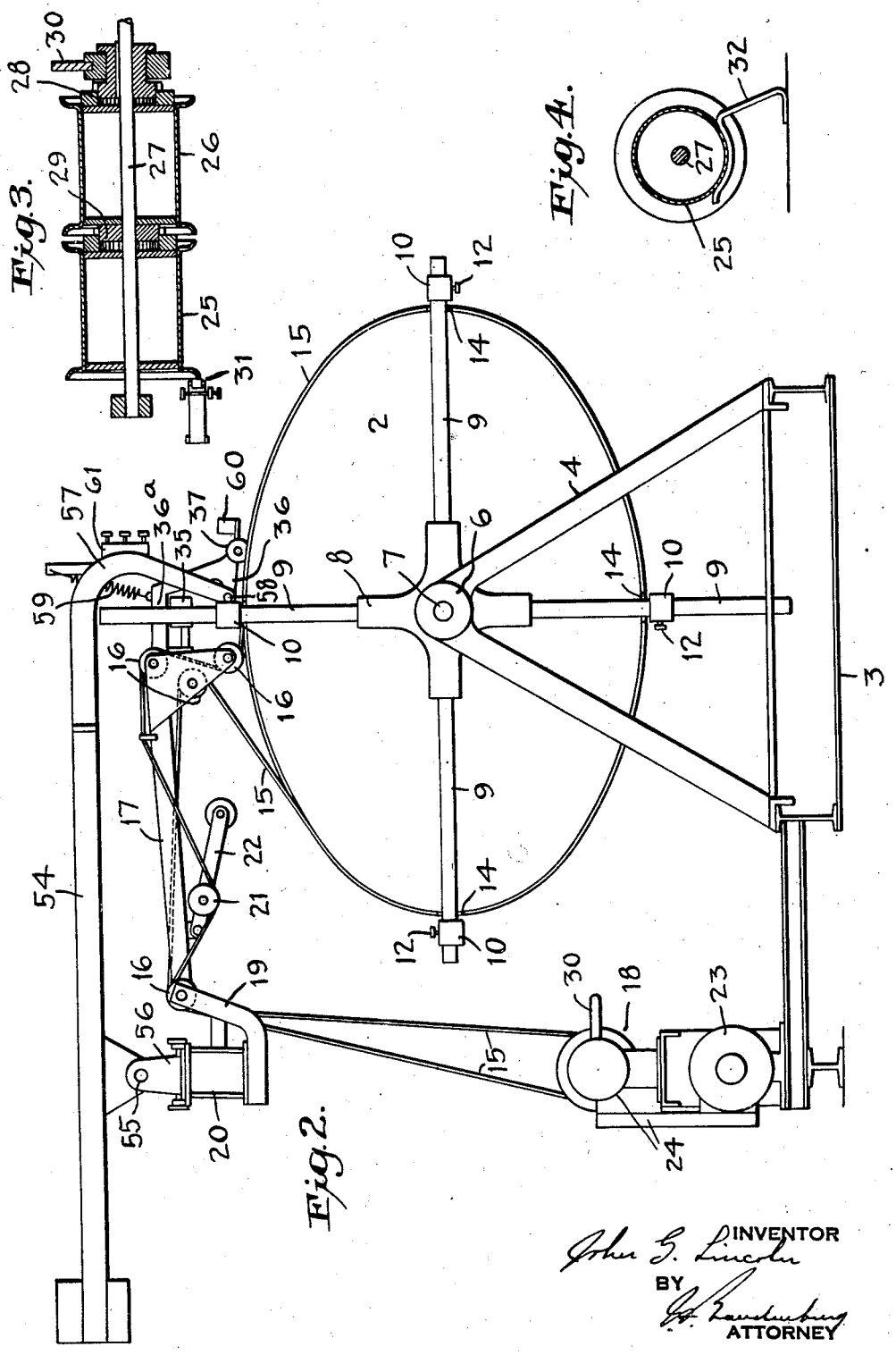

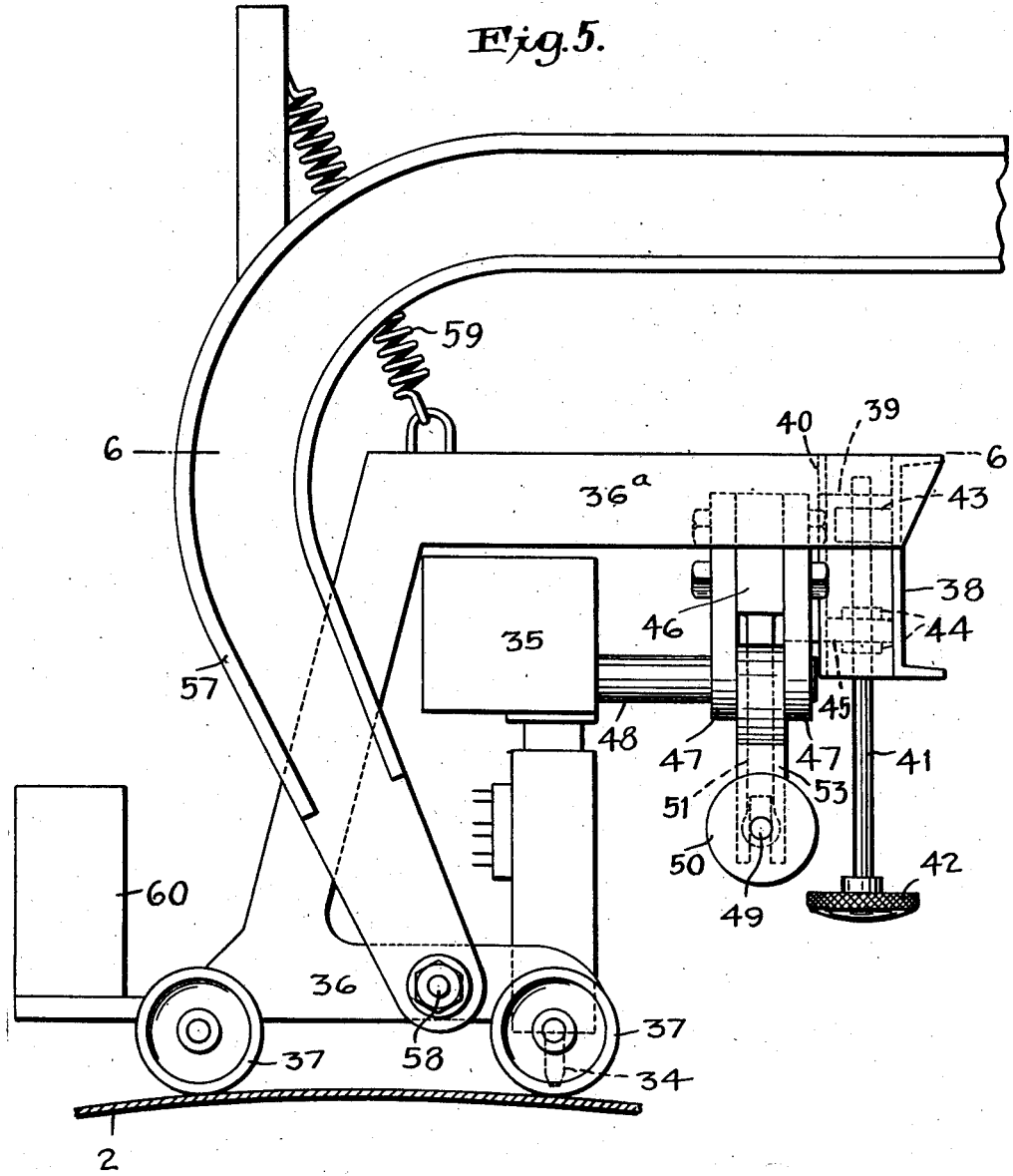

Oct. 1, 1935.  J. G. LINCOLN  2,016,043
WELDING APPARATUS
Filed Jan. 27, 1931  5 Sheets-Sheet 4
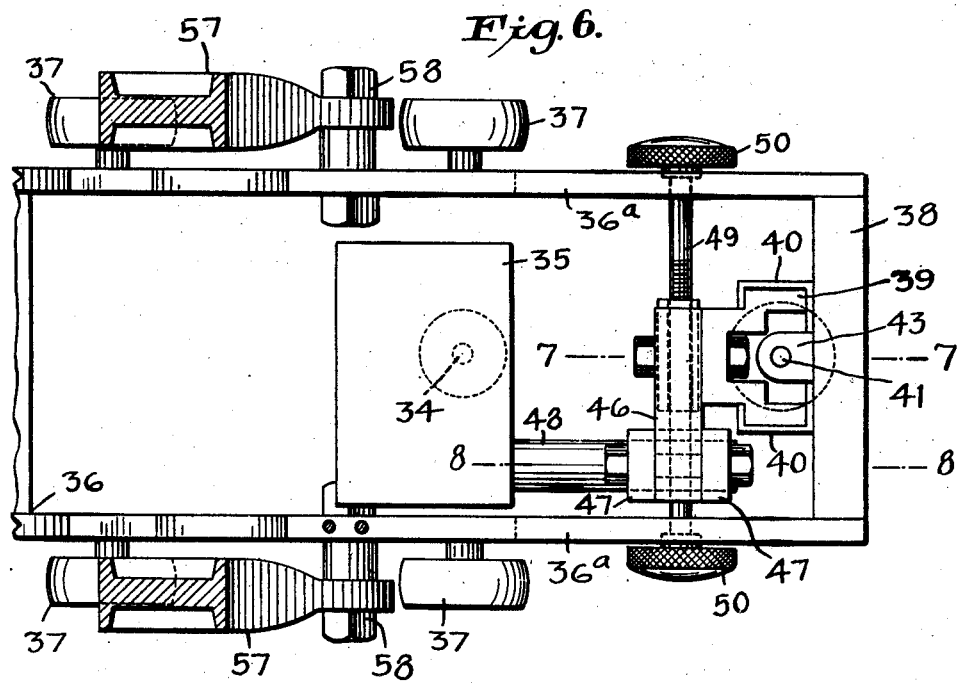
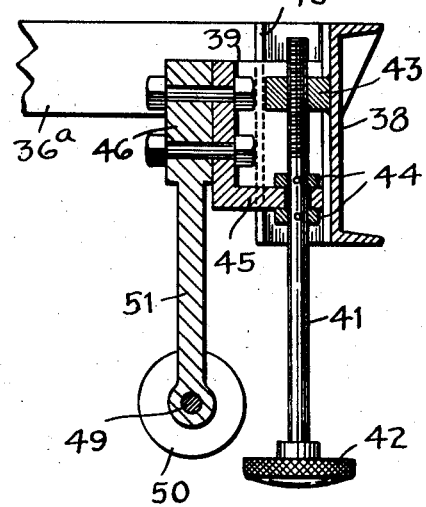
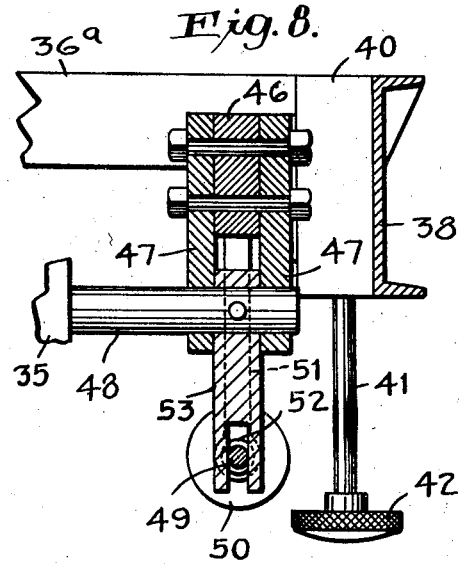
INVENTOR
John G. Lincoln
BY
ATTORNEY

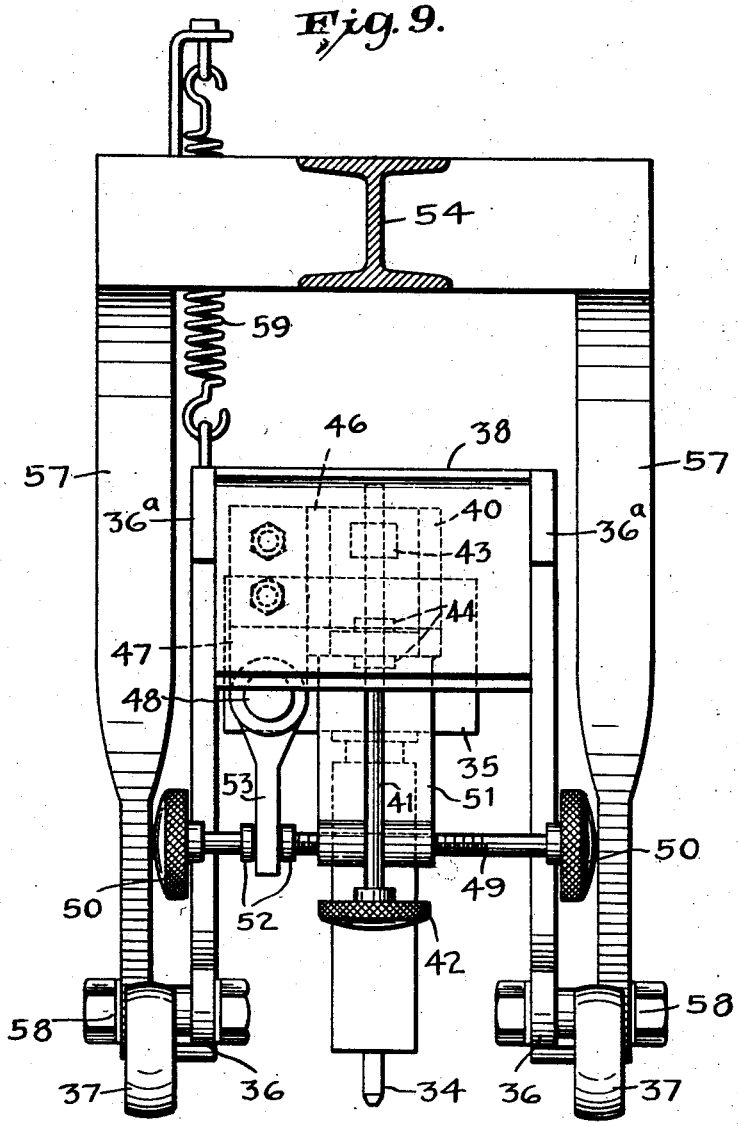

Patented Oct. 1, 1935

2,016,043

UNITED STATES PATENT OFFICE 2,016,043

WELDING APPARATUS

John G. Lincoln, Aurora, Ohio, assignor to The Davis Welding & Manufacturing Company, Cincinnati, Ohio, a corporation of Ohio Application January 27, 1931, Serial No. 511,466

20 Claims. (Cl. 219—8)

The invention relates to welding apparatus, and more especially to apparatus for welding seams by the electric arc.

The special problem which gave rise to the invention is the welding in a substantially automatic manner of the circumferential seams of elliptical tanks, but the invention is not necessarily limited to the precise character of the work.

The particular object of the invention is to provide a machine or apparatus for welding circumferential seams in non-circular work, the machine to be capable of performing the operation expeditiously and satisfactorily, and to be convenient to operate and easy to control.

One of the objects of the invention is to insure a constant linear welding speed. Another object is to preserve an approximately constant relation between the electrode and the seam.

The machine comprises means for supporting and rotating the work, and more specifically for supporting and rotating it about a fixed axis. Various features in respect to the manner of holding the work can best be described in the body of the specification.

An important feature of the combination is the provision of means for rotating the non-circular work at uniform circumferential speed. This is best accomplished with the aid of a driving band which is passed about the circumference of the work, or about the circumference of a dummy of similar contour. Various aspects of the invention having to do with this mode of rotating the work will be described as the specification proceeds.

Another important feature of the invention relates to the support and automatic control of the welding head so that it moves in conformity with the varying eccentricity of the circumference traveling past it.

Other features and objects of the invention will be apparent to those skilled in the art from a consideration of the preferred embodiment illustrated in the accompanying drawings and described herein.

In the drawings, which form part hereof:

Fig. 2 is an end elevation;

Fig. 3 is a longitudinal section through a drum assembly;

Fig. 4 is a cross-section taken through one of the drums;

Fig. 5 is a side elevation showing the welding head, its floating truck, and a portion of the swinging arm to which the truck is pivoted;

Fig. 6 is a section taken on the line 6—6 of Fig. 5;

Figure 1:
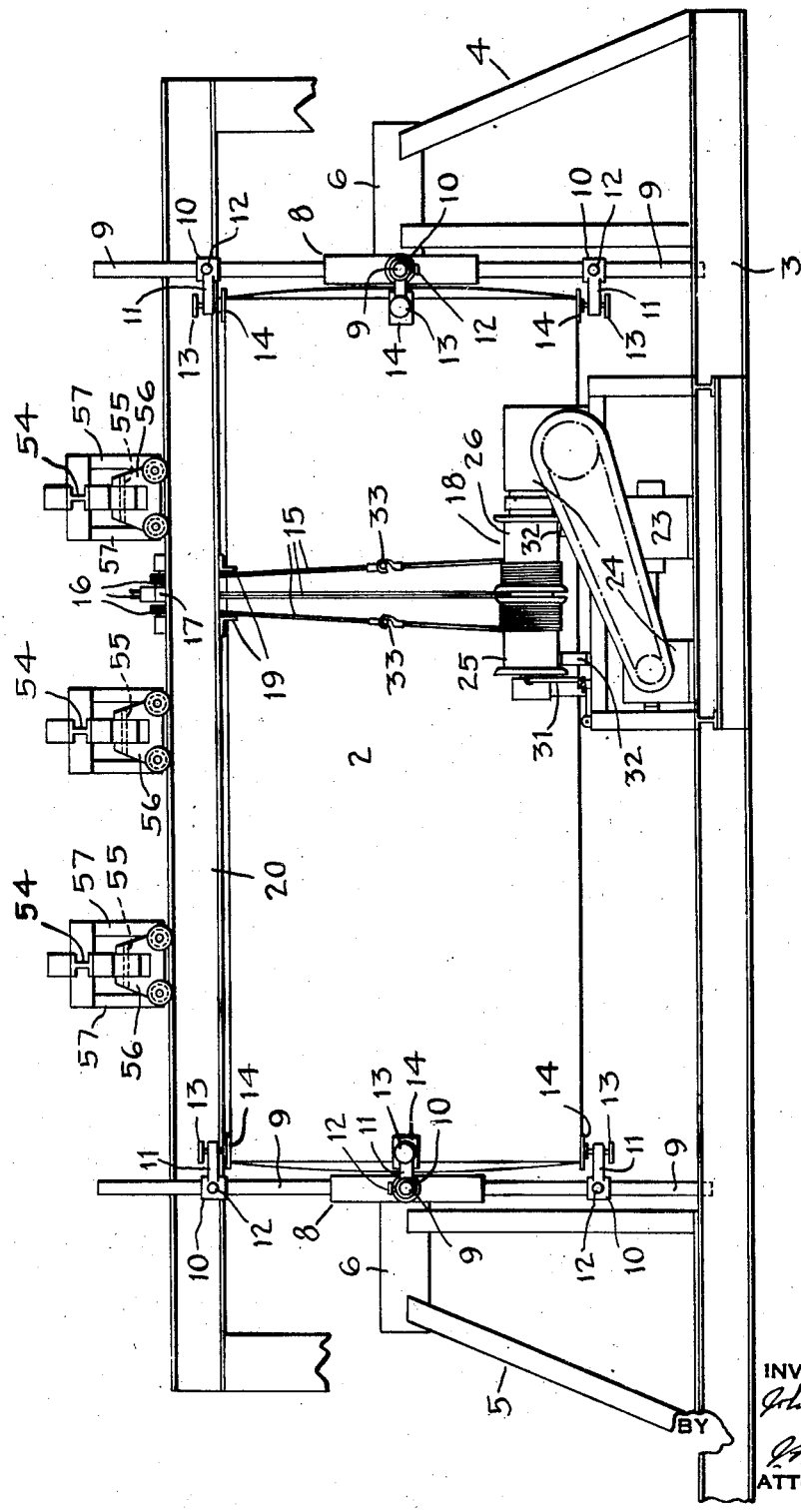
Fig. 1 is a rear elevation of a machine constituting a practical embodiment of the invention.

Figs. 7 and 8 are sections taken on the lines 7—7 and 8—8 of Fig. 6;

Fig. 9 is a rear elevation of the welding head, truck and arm, the last being cut by a plane of section; and Fig. 10 is a fragmentary rear elevation sufficiently illustrating a modification of the invention in which the driving band is passed about a dummy-piece instead of about the work itself.

An elliptical tank 2 is shown in Figs. 1, 2 and 10. The particular tanks for the welding of which the illustrated machine was designed are compartment tanks having a number of circumferential welds, including welds between the outside end heads and the corresponding shells, and numerous welds intermediate the ends, between the compartments, the welds to be made being lap welds. This is given by way of explanation and not in limitation of the invention. No attempt has been made to show the seams or welds in the drawings. The parts of the work may be preliminarily tacked together or may be otherwise held in proper relation for welding.

The machine has a base frame 3, on which are two end supports 4 and 5. The support 4 is preferably fixed, whereas the support 5 can be shifted to vary the spacing between the supports to enable the machine to operate on tanks of different lengths.

At the tops of these supports are blocks 6 holding alined axles, one of which is marked 7 in Fig. 2. These axles carry rotatable holders 8, preferably in the form of spiders, each spider 35 having four arms 9 in right-angular relation. The collars 10 of clamp brackets 11 can be shifted in or out on these arms to accommodate tanks of different major and minor diameters, and can also be swiveled on the arms so that the clamps 40 can be turned out of the way. This feature facilitates introduction and removal of successive tanks of the same length, since for that purpose it is necessary to swing only two of the clamps, one at each end, free of the ends of the tank. In making welds at the ends of the tank, it also enables the attendant to swing each clamp out of the way of the electrode before the clamp reaches the latter, and to replace the clamp in holding relation after passing the electrode. The clamps are fixed in position on the arms of the spiders by readily releasable set-screws 12.

The clamp elements 13 have screw stems which are threaded through the brackets 11 and broad feet 14 to bear on the circumference of the tank, at the ends.

The tank is turned at substantially uniform circumferential speed by a band 15, for example one made of wire rope, which is passed about the circumference of the tank, the band being preferably wrapped twice around the work. The leads of this band are guided over various pulleys 16 carried by a pivoted arm 17 extending from the rear over the top of the tank, and pass downward to a winding apparatus 18. The arm 17 is shown pivoted to a bracket 19 projecting from a longitudinal beam 20. Constant tension in the band is maintained by passing it under a pulley 21 on a weighted arm 22 pivoted to the arm 17.

The winding apparatus is driven by a reversible electric motor 23 through a suitable transmission 24. It comprises two drums 25 and 26 on a driven shaft 27. The two ends of the band 15 are connected, respectively, to the two drums, and the latter are driven as a unit so that the band is wound on one drum while it is being unwound from the other. The drums can be disconnected, however, so that the band can be tightened by turning the drums by hand in opposite directions. This also enables the length of the band not on the drums to be lengthened or shortened for different sizes of tanks.

The connection and disconnection of the drums is preferably provided for by means of two toothed clutches 28 and 29. The clutch 28 connects and disconnects the drum 26 with respect to the shaft 27, and is operated by a handle 30, whereas the clutch 29, between the two drums, is connected and disconnected by sliding the drum 25 on the shaft. The drum 25 is held in position by a releasable retainer 31.

Brakes 32 bearing against the drums prevent overrunning when current to the motor is cut off.

Disconnectible fastenings 33 in the two leads of the driving band make it possible to separate the band when a tank is to be removed and another put in the machine.

Welding is accomplished by an electric arc between the tank and a carbon electrode 34, the latter being held in a welding head 35. The welding head is supported by a four-wheeled truck 36, the wheels 37 of which rest on the surface of the tank when the machine is in operation, thereby keeping the electrode in definite relation to the work.

The truck has a pair of overhanging arms 36ᵃ connected at their ends by a piece 38. A block 39 is guided for vertical adjustment in guides 40 on the piece 38, and can be shifted up or down by the attendant during the course of the work, by means of a screw shaft 41 having a knob 42. This shaft is threaded through a projection 43 fixed to the piece 38 and has collars 44 which embrace a portion 45 of the vertically slidable block.

A laterally extending piece 46 is bolted to the block 39, and to the end of this piece are bolted two cheek pieces 47. The block 39 and the pieces 46 and 47 constitute one part, made in the manner described for purpose of convenience.

A horizontal shaft 48 is rotatably supported in the cheek pieces 47, the axis of this shaft extending in a fore and aft direction with respect to the truck 36. The welding head 35 is supported by this shaft, and by turning the shaft the electrode 34 can be shifted laterally to follow any deviation of the seam.

This lateral control is effected by a screw shaft 49 having handle knobs 50, this shaft being threaded through a downward extension 51 of the piece 46 and having collars 52 which embrace the slotted end of a crank 53 fixed to the shaft 48.

The welding head truck 36 is confined to a floating position on top of the work by an overhanging and counterweighted arm 54, which is pivoted at 55 to a carriage 56. This carriage is movable along the longitudinal beam 20, to bring the welding head to any one of the seams to be welded. The longitudinal arrangement of the beam or track 20 has reference to its parallelism to the axis about which the work is turned.

It will be understood that the counterweighting of the arm 54 is not sufficient to keep the truck carrying the welding head from resting on the tank parts or set-up, and from rising and falling as the broader and narrower dimensions of the set-up pass under the truck.

The forward part of the arm 54 is bifurcated to present two downwardly extending horns 57, the lower ends of which are pivoted at 58 to the sides of the truck 36, preferably near the level of the wheels 37.

The pivots 55 and 58 allow for rising and descending movement of the truck in response to the varying eccentricity of the work. The pivoting of the arm 54 also permits the arm to be swung back out of the way, carrying the truck and the welding head with it.

In order to keep the truck from swinging to an inoperative position when the arm 54 is raised and moved back, it is desirable to connect a spring 59 between the truck and the arm. It is also desirable to provide the truck with a counter-balance weight 60 at the opposite end from the overhanging part 36ᵃ of the truck and parts carried thereby.

The most uniform spacing of the end of the electrode from the work is obtained by so disposing the welding head 35 in relation to the truck 36 that the electrode 34 passes adjacent the transverse region of a pair of the wheels 37. As shown, the axis of the carbon intersects the axis of these wheels.

Reference has heretofore been made to the keeping of the electrode in definite relation to the work. This includes maintaining, within limits, an operative or approximately constant angle between the electrode 34 and the seam. This is distinctly important for the success of the welding. As shown in Fig. 5, the carbon is very nearly perpendicular to the tangent of the seam at the point of welding, but it will be evident that during the rotation of the elliptical or other non-circular shape the carbon will be tilted slightly in one direction or the other, and that such tilting will sometimes be in the direction in which the seam is traveling and sometimes in a backward direction. Too much obliquity of the electrode in relation to the seam, particularly if it were a backward inclination, would be seriously detrimental. The construction of the machine is such as to limit the deviation of the electrode from the perpendicular to the seam to approximately 15° plus or minus.

For this purpose the truck and the welding head are balanced, so that when the truck is tilted uphill or downhill, relatively to the horizontal, by the varying eccentricity of the rotating shape to be welded, the vertical through the center of gravity of the truck and head falls between the front and rear wheels or their equivalent supports, which rest on the tank.

In order to enable the machine to weld small as well as large tanks, it is desirable to have the front and rear floating supports of the truck fairly close together, as shown. Since it is important to keep all relations between the electrode and the seam as constant as possible, it is advantageous that the electrode be close to the axis of one pair of wheels, or close to any corresponding region of floating support. If the front and rear supports were far apart, that would be satisfactory for large tanks, but on small tanks the electrode would, at different times, be tilted too far from normal to the seam. With the wheels comparatively close together, the tilting of the truck in relation to the horizontal, as the elliptical tank revolves beneath it, would be such as to carry the center of gravity well beyond one end or the other of the supporting base, with the result that the truck and head would tilt over on the front or rear support, the other support rising away from the surface of the tank,—which would destroy the operative welding relation. The counterbalancing of the truck with its overhanging head, as by means of properly disposed weight and/or spring (the weight 60 and spring 59, for example), preserves an approximately constant relation by causing the truck to ride properly at all times on the set-ups.

A switch 61 located on the front part of the arm 54, near the control knobs 42 and 50 for adjusting the welding head, is used for starting, stopping and reversing the motor 23.

The operation of the machine will be briefly described. A tank is placed between the holders 8 and is gripped by the clamps 13. The parts of the band 15 are passed about the tank and the fastenings 33 are connected. The band is tightened by disconnecting and relatively turning the drums 25 and 26, after which the drums are again connected. The arm 54, which had been swung back out of the way, is lowered to lower the truck 36 down on top of the tank where it rests. The arm, with the truck 36 and the welding head, are moved by shifting the carriage 56 along the beam so as to bring the electrode 34 to the vertical plane in which the seam is to be welded. Further adjustment of the welding head may be made at this time by means of the manual controls 42 and 50, and the attendant operates these controls as necessary during the welding operation. The arc is struck and the motor 23 is started. The tank is rotated at non-uniform angular speed but at uniform circumferential speed through the action of the band 15. The seam travels beneath the electrode and the weld is made. When the weld is completed the motor is stopped and the welding current is cut off.

Before making the next weld, the carriage 56 is shifted to the new position, moving the arm 54, truck 36 and welding head 35 with it. The tank can not be rotated in the same direction as before, since the band 15 can not be wound indefinitely on one of the drums 25, 26 or be indefinitely unwound from the other. Therefore, in making the new weld the drums are driven in the direction reverse to that in which they were turned for the making of the preceding weld.

The machine has been described as if it possessed a single welding head 35. Much time can be saved, however, by providing the machine with two or more welding heads, each supported by a floating truck 36, each truck pivoted to a swinging arm 54, and each arm pivoted to a carriage 56. This is sufficiently illustrated in Fig. 1 where three carriages 56 are shown on the beam 20, each with an arm 54, each of which, it will be understood, has a truck and a welding head at its forward end. The carriages 56 are movable relatively to each other along the beam, so that the several electrodes can be positioned in respect to as many seams, whatever the spacing of the seams may be lengthwise of the tank.

Fig. 10 illustrates a modification in which a dummy 62 is applied to an extension 7ª of the axle of one of the holders 8. This dummy, it will be understood, has the same contour as the tank 2, with its major and minor dimensions similarly oriented. The driving band 15, in this instance, is passed about the dummy instead of about the tank itself, but to all intents and purposes the manner of rotating the tank at uniform circumferential speed is the same in both forms of the invention. The modified plan saves time in removing tanks from and placing them in the machine, and is useful when a substantial number of tanks of the same cross-sectional shape and area are to be welded. Naturally, the dummy 62 may be removable so as to be replaced by others of different sizes.

While preferred embodiments of the invention have been described in detail, it will be understood that the description and drawings are illustrative rather than limiting, and that many changes can be made without departing from essentials. The claims are intended to cover all generic and specific features of the invention and all statements of scope which as a matter of language might be said to fall therebetween.

I claim:

1. Circumferential seam welding apparatus, comprising means for rotatably supporting noncircular work, an electric welding head movable in conformity with the eccentricity of non-circular work, and means for rotating such work in relation to the welding head at uniform circumferential speed and consequently at non-uniform angular speed, said means comprising a driving band to pass about the circumference.

2. Circumferential seam welding apparatus, comprising means for rotatably supporting noncircular work, an electric welding head movable in conformity with the eccentricity of non-circular work, means for rotating such work in relation to the welding head at uniform circumferential speed and consequently at non-uniform angular speed, said means comprising a driving band to pass about the circumference, and a pivoted arm carrying guides for said band.

3. Circumferential seam welding apparatus, comprising means for rotatably supporting noncircular work, an electric welding head movable in conformity with the eccentricity of non-circular work, means for rotating such work in relation to the welding head at uniform circumferential speed and consequently at non-uniform angular speed, said means comprising a driving band to pass about the circumference, winding apparatus to which the ends of said band are connected, and reversible means for driving said winding apparatus.

4. Circumferential seam welding apparatus, comprising a welding head movable in conformity with the eccentricity of non-circular work, means for rotating such work in relation to the welding head at uniform circumferential speed, said means comprising a driving band to pass about the circumference, two drums to which the ends of said band are connected, means for driving said drums, and means for disconnecting the drums for taking up or letting out the band.

5. Circumferential seam welding apparatus, comprising two end supports carrying alined axles, holders, free to rotate on said axles, and clamps on said holders adjustable to engage non-circular work, in combination with means for rotating such work thus held at uniform circumferential speed, and a welding head movable in conformity with the eccentricity of the circumference of the work.

6. Circumferential seam welding apparatus as set forth in claim 5, wherein the holders are in the form of spiders, and the clamps can be positioned at different points on the arms of the spiders to accommodate different sizes of work.

7. Circumferential seam welding apparatus as set forth in claim 5, wherein the holders are in the form of spiders, and the clamps can be positioned at different points on the arms of the spiders to accommodate different sizes of work, the clamps or certain of them being also swiveled so that they can be moved clear of the ends of the work.

8. Circumferential seam welding apparatus as set forth in claim 5, wherein one of the end supports is movable to accommodate work of different lengths.

9. Apparatus for welding circumferential seams of tanks, comprising rotatable end holders provided with clamps to grip the circumference of the tank, means for rotating the tank, a welding head, and means for supporting the same in relation to the tank, said clamps being connected with the holders in such manner that they can be individually moved out of the way before reaching the welding head.

10. Circumferential seam welding apparatus, comprising means for rotating the work, a welding head, a truck carrying said head and adapted to rest and float on the circumference of the work, and means confining said truck to a given floating position.

11. Circumferential seam welding apparatus, comprising means for rotating the work, a welding head, a truck carrying said head and adapted to rest and float on the circumference of the work, and a swinging arm to which said truck is pivoted and which permits it so to rest and float.

12. Circumferential seam welding apparatus comprising means for rotating the work, a welding head, a truck carrying said head and adapted to rest and float on the circumference of the work, and means confining said truck to a given floating position, said head being movably connected with said truck, and control mechanism for shifting said head to follow the same.

13. Circumferential seam welding apparatus, comprising means for rotating the work, a welding head, a truck carrying said head and adapted to float on the circumference of the work, means confining said truck to a given floating position, intermediate supports between said head and said truck enabling the head to be moved toward or from the work and also laterally, and manual means for shifting the head as the work progresses.

14. Circumferential seam welding apparatus, comprising means for rotating the work, a welding head, a truck carrying said head and adapted to float on the circumference of the work, a swinging arm to which said truck is pivoted, and a spring connecting said truck with said arm.

15. Circumferential seam welding apparatus, comprising means for rotating the work, a welding head, a truck carrying said head and adapted to float on the circumference of the work, a swinging arm to which said truck is pivoted, a carriage to which said arm is pivoted, and a longitudinal track along which said carriage can be shifted.

16. Circumferential seam welding apparatus, comprising means for rotating the work, a longitudinal guide, a plurality of carriages independently movable along said guide, arms pivoted to said carriages, trucks pivoted to said arms to float on the circumference of the work, and welding heads supported by said trucks, so that a number of seams can be welded simultaneously.

17. Apparatus for welding circumferential seams of non-circular work, comprising means for rotatably supporting the work, means for rotating the work at uniform circumferential speed, a welding head with its electrode, and a floating truck carrying said head and having at least three points of support whereon it rests upon the work, said truck and head being balanced so as to preserve an approximately definite angular relationship between the electrode and the seam.

18. Apparatus for welding circumferential seams of non-circular work, comprising means for rotatably supporting the work, means for rotating the work at uniform circumferential speed, a welding head with its electrode, and a floating truck carrying said head and having at least three points of support whereon it rests upon the work, a swinging arm to which the truck is pivotally connected, said truck and head being balanced so as to preserve an approximately definite angular relationship between the electrode and the seam.

19. Apparatus for welding circumferential seams of non-circular work, comprising means for rotatably supporting the work, means for rotating the work at uniform circumferential speed, a floating truck having at least three points of support whereon it rests upon the work, and a welding head, with its electrode, so connected with and carried by said truck that its electrode passes adjacent one of the regions of support.

20. Apparatus for welding circumferential seams of non-circular work, comprising means for rotatably supporting the work, means for rotating the work at uniform circumferential speed, a floating truck having at least three points of support whereon it rests upon the work, a welding head, with its electrode, so connected with said truck that its electrode passes adjacent one of the regions of support, and means for balancing said truck and head.

JOHN G. LINCOLN.